(12) United States Patent
Mohamed Sayed Ahmed et al.

(10) Patent No.: US 10,848,075 B2
(45) Date of Patent: *Nov. 24, 2020

(54) REACTIVE AFE POWER CONTROL

(71) Applicant: Rockwell Automation Technologies, Inc., Mayfield Heights, OH (US)

(72) Inventors: Ahmed S. Mohamed Sayed Ahmed, Mequon, WI (US); Ehsan Al-Nabi, Cambridge (CA); Zhendong Zhang, Mequon, WI (US); Sang Woo Nam, Cambridge (CA)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/706,694

(22) Filed: Dec. 7, 2019

(65) Prior Publication Data

US 2020/0313566 A1 Oct. 1, 2020

Related U.S. Application Data

(63) Continuation of application No. 16/370,774, filed on Mar. 29, 2019, now Pat. No. 10,523,128.

(51) Int. Cl.
*H02M 7/217* (2006.01)
*H02M 5/458* (2006.01)
*H02P 27/06* (2006.01)

(52) U.S. Cl.
CPC ......... *H02M 7/217* (2013.01); *H02M 5/4585* (2013.01); *H02P 27/06* (2013.01)

(58) Field of Classification Search
CPC ........ H02M 7/02; H02M 7/21; H02M 7/2173; H02M 7/48; H02M 7/2176; H02M 7/217; H02M 5/458; H02M 5/40; H02M 5/4585; H02M 5/45; H02M 5/4505; H02M 5/451; H02M 5/453; H02P 27/06; H02P 27/16

See application file for complete search history.

(56) References Cited

U.S. PATENT DOCUMENTS

| | | |
|---|---|---|
| 5,905,644 A | 5/1999 | Blasko et al. |
| 7,139,180 B1 | 11/2006 | Herbert |
| 7,804,256 B2 | 9/2010 | Melanson |

(Continued)

OTHER PUBLICATIONS

Reference paper: V. Kaura and V. Blasko, "Operation of a voltage source converter at increased utility voltage," in IEEE Transactions on Power Electronics, vol. 12, No. 1, p. 132-137, Jan. 1997.

(Continued)

*Primary Examiner* — Adolf D Berhane
(74) *Attorney, Agent, or Firm* — Fay Sharpe LLP (57) ABSTRACT

An active rectifier with a controller including a feedforward component, a modulator and a modulation index controller. The modulator generates switching control signals according to a reference to convert AC input power from the AC input to control the DC bus voltage at the DC output. The feedforward component computes the reference according to an estimated total inductance of the AC input, a grid voltage of the AC input, a modulation index reference, and a reactive power offset signal, and the modulation index controller computes the reactive power offset signal according to an error between the modulation index reference and a feedback modulation index.

20 Claims, 10 Drawing Sheets

(56) References Cited

U.S. PATENT DOCUMENTS

| | | |
|---|---|---|
| 7,944,160 B2 | 5/2011 | Hiti et al. |
| 9,948,108 B2 | 4/2018 | Eren et al. |
| 10,378,951 B2 | 8/2019 | Miklosovic et al. |
| 10,523,128 B1 * | 12/2019 | Mohamed Sayed Ahmed ............ H02P 27/08 |
| 10,541,626 B1 * | 1/2020 | Lamb ................ H02M 7/53875 |
| 10,601,343 B1 * | 3/2020 | Lamb .................... H02P 27/085 |
| 10,615,705 B1 * | 4/2020 | Miklosovic ......... H02M 5/4585 |
| 10,644,635 B2 * | 5/2020 | Ganesan ................. H02P 31/00 |
| 10,680,547 B2 * | 6/2020 | Xiao ....................... H03H 7/06 |
| 2005/0190094 A1 | 9/2005 | Andersen |
| 2011/0175354 A1 | 7/2011 | Bo et al. |
| 2015/0365003 A1 | 12/2015 | Sadwick |
| 2017/0141701 A1 | 5/2017 | Rhee et al. |
| 2017/0175354 A1 | 6/2017 | Sun et al. |
| 2018/0083529 A1 | 3/2018 | Pant et al. |

OTHER PUBLICATIONS

ABB : ACA 635 IGBT Supply Sections 260 to 4728 kVA, ACS 800-17 Line-side Converter 120 to 1385 kVA, http://library.e.abb.com/public/.../en_aca635_um_and_update_D.pdf, pp. 6-1 through 6-12.

Siemens: simovert master drives Active Front End, https://www.industry.usa.siemens.com/drives/...drives/...siemens-drives/masterdrives . . . , pp. 1 and 12-1 through 12-40.

\* cited by examiner

REACTIVE AFE POWER CONTROL

CROSS-REFERENCE TO RELATED APPLICATION

This application is a continuation of, and claims priority to, and the benefit of, U.S. patent application Ser. No. 16/370,774, entitled "REACTIVE AFE POWER CONTROL", and filed on Mar. 29, 2019, the entirety of which is hereby incorporated by reference.

BACKGROUND INFORMATION

The disclosed subject matter relates to power conversion systems and active rectifiers.

BRIEF DESCRIPTION

Various aspects of the present disclosure are now summarized to facilitate a basic understanding of the disclosure, wherein this summary is not an extensive overview of the disclosure and is intended neither to identify certain elements of the disclosure, nor to delineate the scope thereof. Rather, the primary purpose of this summary is to present the concept of the disclosure in a simplified form prior to the more detailed description that is presented hereinafter.

Control techniques, controllers, and active rectifiers are described. In one example, a controller includes a feedforward component, a modulator and a modulation index controller. The modulator generates switching control signals according to a reference to convert AC input power from the AC input to control the DC bus voltage at the DC output. The feedforward component computes the reference according to an estimated total inductance of the AC input, a grid voltage of the AC input, a modulation index reference, and a reactive power offset signal. The modulation index controller computes the reactive power offset signal according to an error between the modulation index reference and a feedback modulation index.

DETAILED DESCRIPTION

Referring now to the figures, several embodiments or implementations are hereinafter described in conjunction with the drawings, wherein like reference numerals are used to refer to like elements throughout, and wherein the various features are not necessarily drawn to scale. In the following discussion and in the claims, the terms "including", "includes", "having", "has", "with", or variants thereof are intended to be inclusive in a manner similar to the term "comprising", and thus should be interpreted to mean "including, but not limited to . . . " Also, the term "couple" or "couples" is intended to include indirect or direct electrical or mechanical connection or combinations thereof. For example, if a first device couples to or is coupled with a second device, that connection may be through a direct electrical connection, or through an indirect electrical connection via one or more intervening devices and connections.

Figure 1:
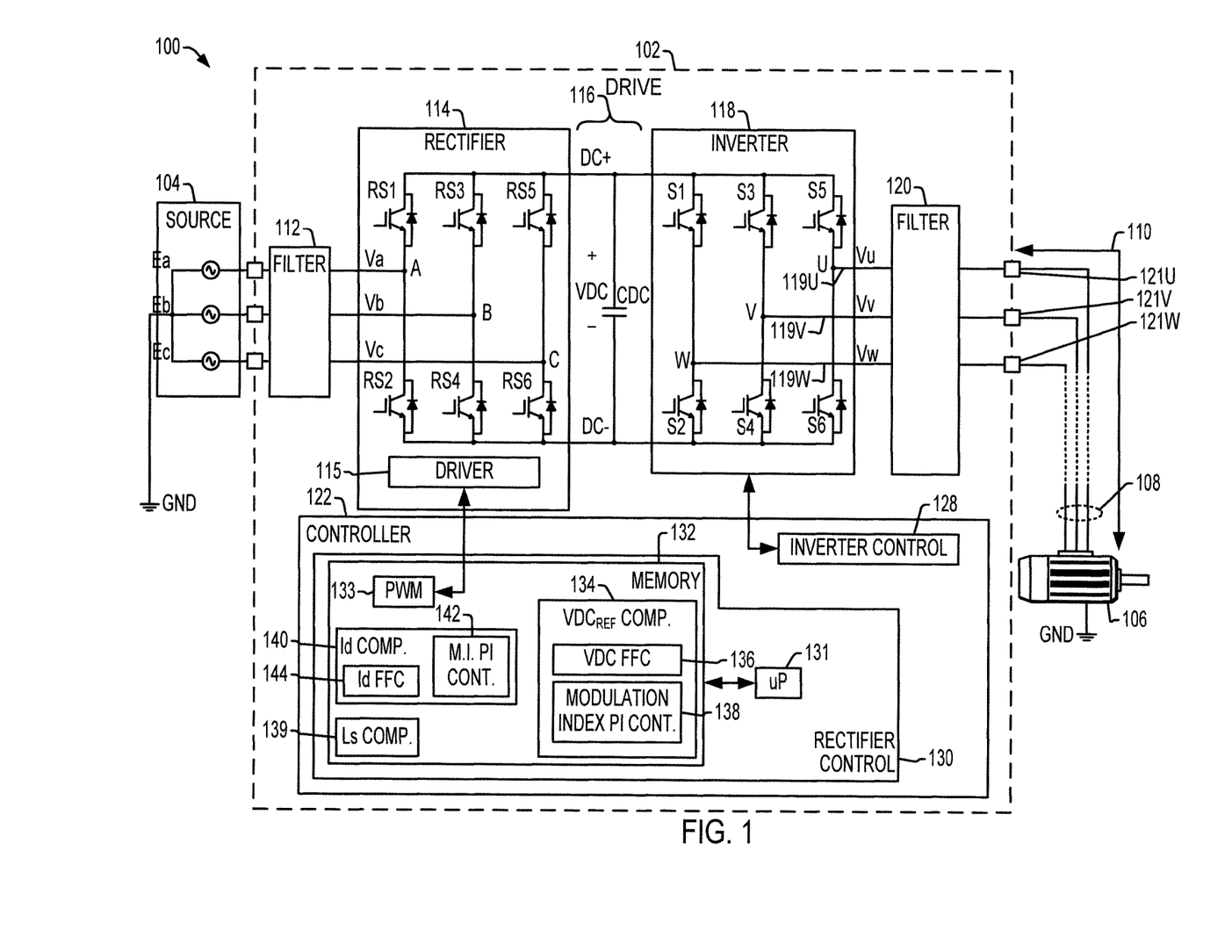
FIG. 1 is a schematic diagram.
Figure 2:
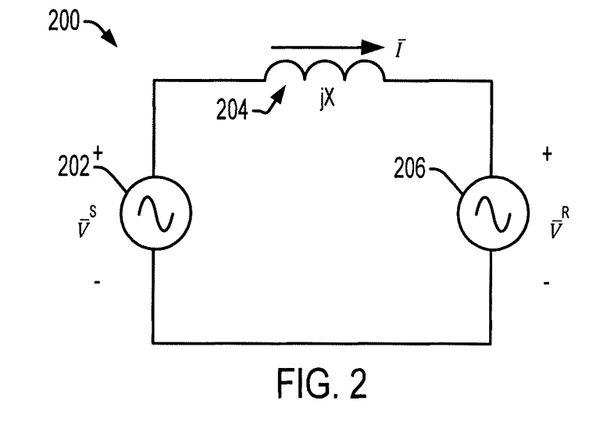
FIG. 2 is a schematic diagram.

FIG. 1 shows an industrial system 100 with a motor drive power conversion system 102 that receives and converts AC electrical input power from a source 104 to drive a motor load 106 through a long motor cable 108 having a cable length 110. The AC input and output of the converter 102 are three phase configurations in the illustrated examples. Other implementations are possible using any combination of single or multiphase inputs and outputs to drive the motor 106 or other type of load. The motor drive 102 receives single or multiphase AC input power from a grid or other AC power source 104 and converts this to a DC bus voltage using an active front end (AFE) rectifier 114 which provides a DC output voltage to a DC bus circuit 116 having one or more capacitors CDC. The example power conversion system 102 in FIG. 1 is a voltage source converter (VSC) motor drive, which includes an input filter 112 between the source 104 and the active rectifier 114, as well as a DC bus circuit 116 with a DC bus capacitor CDC, an inverter 118 with an inverter output 119 (e.g., output phase lines 119U, 119V and 119W), an output filter circuit (e.g., filter) 120 with output terminals 121U, 121V and 121W, and a controller or control circuit 122.

The example three phase AC power source 104 provides AC phase voltage signals Ea, Eb and Ec to the inputs of the input filter 112, and the filter 112 provides filtered AC input voltage signals Va, Vb and Vc to the respective phase input lines A, B and C of the active rectifier 114. The active rectifier 114 includes rectifier switching devices RS1, RS2, RS3, RS4, RS5 and RS6 (e.g., IGBTs, etc.) operated according to rectifier switching control signals from the controller 122 via a driver circuit 115 to convert input AC electrical power to provide the DC bus voltage in the DC bus circuit 116. Other configurations are possible in which the drive 102 receives input DC power from an external source (not shown) to provide an input to the inverter 118, in which case the rectifier 114 may be omitted. The illustrated motor drive 102 is a voltage source converter configuration including one or more capacitive storage elements in the DC bus circuit 116. The DC bus circuit 116 may include a single capacitor CDC or multiple capacitors connected in any suitable series, parallel and/or series/parallel configuration to provide a DC bus capacitance across the inverter input terminals.

The controller 122 includes an inverter controller 128 that provides inverter switching control signals to operate the switches S1-S6 of the inverter 118 to regulate or control one or more of voltage, current, speed, torque, etc. The controller 122 in certain embodiments implements a motor speed and/or position and/or torque control scheme in which the controller 122 selectively provides the switching control signals to the inverter switches S1-S6 in a closed and/or open-loop fashion according to one or more setpoint values such as a motor speed setpoint. The setpoint in one example is a signal or value generated by the controller 122, or a fixed setpoint value, or such setpoint value can be received from an external system (not shown). In practice, the motor drive 102 may also receive a torque setpoint and/or a position (e.g., angle) setpoint, and such desired signals or values (setpoint(s)) may be received from a user interface and/or from an external device such as a distributed control system, etc. (not shown). As used herein, a signal can be an analog signal, such as a current or a voltage signal, or a signal can include digital values generated or consumed by the controller 122.

The controller 122 also includes a rectifier controller 130 with a processor 131 and an associated electronic memory 132 which stores program instructions to implement a closed loop control program to regulate or control real and reactive current of the rectifier 114 as well as a DC bus voltage VDC across the capacitance (e.g., CDC) of the DC bus circuit 116. In particular, the controller 122 can operate the active rectifier 114 for motoring and/or regeneration operation. In various implementation examples, the rectifier 114 can charge the DC bus capacitor CDC to regulate or maintain a DC bus voltage VDC, as well as regenerate power to the source 104 (e.g., a power grid), provide unity power factor or other regulated power factor correction (PFC) control, and certain examples provide low current distortion (e.g., less than 5% according to IEEE standards). In various implementations, the active front and rectifier 114 can be used in combination with a single inverter to drive a motor (e.g., the illustrated inverter 118 to drive the motor load 106), or in other motor-drive applications where the DC bus circuit 116 is connected to multiple inverters (not shown). In one example, the rectifier 114 is used in a grid tie application where the DC bus circuit 116 is connected to a bus supply circuit, such as a fuel cell, a photovoltaic system with one or more solar cells, etc. (not shown).

Certain examples use a modulation index (MI) control parameter in the controller 130 to operate the active rectifier 114. The AC output voltage provided by the inverter 118 may depend on the DC bus voltage VDC and the inverter control modulation index. The linear region of the modulation index in one example varies to a limit value, such as 1.15 for space vector modulation (SVPWM). In certain operating conditions, it may be desirable to increase the DC bus voltage for example, to facilitate injection of reactive power to the grid or source 104. A minimum DC bus voltage can be calculated for injecting a given amount of reactive power to the grid, provided that the grid equivalent impedance Ls is accurately known. However, the source impedance of the power source 104 and any included input filter 112 is often unknown and may vary with time. Raising the DC bus above what is needed for a given reactive power level can lower the converter efficiency, increase ripple current levels, etc.

The rectifier controller 130 implements modulation index control in one example that uses grid impedance parameters or estimates but provides closed loop regulation to allow the system to accommodate inaccurate estimates and/or inductance value changes without affecting the system performance. In certain implementations, active power control uses the magnitude and angle of the AC line output voltage of the active rectifier 114 for regeneration operation, without unduly increasing the DC bus voltage VDC, and while maintaining adequate capability for power transfer under sudden changes in load condition. The disclosed examples provide a continuous and flexible DC bus voltage control based on the modulation index, for example, using a proportional integral (PI) modulation index control or that operates on a modulation index reference, a proportional gain and an integral gain. Certain implementations provide continuous and configurable control that can be used in various applications. One advantage of the described approach is robustness with respect to several uncertainties in the system such as source inductance including stray inductance added by cables, connections, etc., and/or grid voltage fluctuation.

In the illustrated rectifier 114, the AC input includes AC nodes A, B and C, and the rectifier DC output includes first and second DC nodes labeled DC+ and DC− in FIG. 1. The switching circuit includes the rectifier switching devices RS1-RS6 coupled with the AC input and with the DC output, and individually configured to selectively couple a corresponding one of the AC nodes with a respective one of the first and second DC nodes according to a respective switching control signal from the rectifier controller 130.

The controller 130 includes a modulator 133, such as a pulse width modulation component that generates the switching control signals according to a reference, such as a DC bus voltage reference $VDC_{REF}$, a reactive current reference $Id_{REF}$, etc., in order to cause the switching circuit RS1-RS6 to convert AC input power from the AC input to control the DC bus voltage VDC at the DC output DC+, DC−. In one example, the memory 132 of the rectifier controller 130 includes program instructions executable by the processor 131 to implement various control components for operating the active rectifier 114, including a PWM modulator component 133 and a DC bus voltage reference computation component 134 (labeled $VDC_{REF}$ COMP.), illustrated and described further below in connection with FIG. 6. The DC bus voltage reference computation component 134 in one example includes a DC bus voltage feedforward control component 136 (labeled VDC FFC), and a modulation index PI control component 138 (labeled MODULATION INDEX PI CONT.). In certain implementations, the memory 132 also includes executable instructions to implement an inductance estimation or computation component 139 (labeled Ls COMP.). In one example, the memory 132 also includes executable instructions to implement a reactive current computation component 140 (labeled Id COMP., illustrated and described further below in connection with FIG. 12), which includes a modulation index PI control component 142 (labeled M.I. PI CONT.) and a reactive current feedforward control component 144 (labeled Id FFC).

The feedforward components 136 and 144 in one example operate to compute a reference (e.g., $VDC_{REF}$, $Id_{REF}$) according to an estimated total inductance Ls of the AC input, a grid voltage VG of the AC input, a modulation index reference Mi_Ref, and a reactive power offset signal VAR_PID_out. The respective modulation index controllers 138, 142 in one example operate to compute a reactive power offset signal VAR_PID_out according to an error signal that represents the error between the modulation index reference Mi_Ref and a feedback modulation index Mi_fdbck. The modulator 133 generates the rectifier switching control signals according to the computed reference, in order to cause the switching circuit to convert the AC input power from the AC input to control the DC bus voltage VDC at the DC output.

Figure 3:
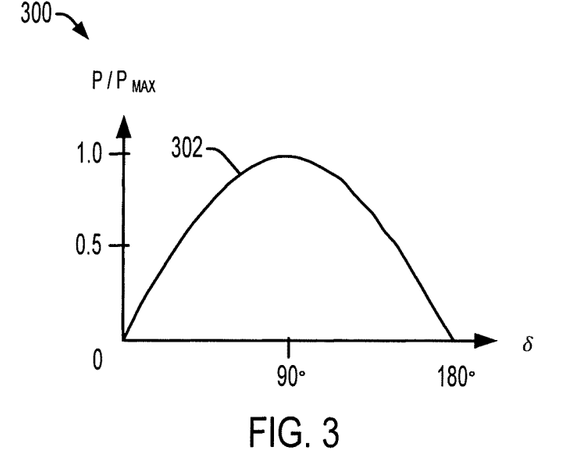
FIG. 3 is a graph.
Figure 4:
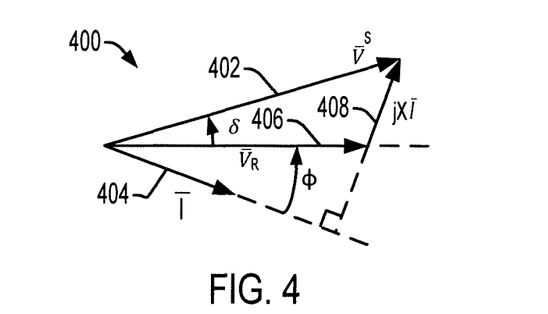
FIG. 4 is a vector diagram.

Referring also to FIGS. 2-5, FIG. 2 shows a simplified representation of the AC interface of the rectifier 114 with the source 104, ignoring any effects of AC capacitance in the input filter 112 (e.g., an LCL filter). The simplified circuit 200 in FIG. 2 includes a simplified representation of the source 202, the total inductance 204, and the rectifier 206. The illustrated combination of the input filter inductance with the source inductance has a total reactance X. $V_S$ denotes the source (e.g., sending) end of the circuit. In addition, VR denotes the rectifier (e.g., receiving) end. FIG. 3 shows a graph 300 with a power ratio curve 302 (e.g., $P/P_{MAX}$) as a function of the power angle δ, and FIG. 4 shows a vector diagram including a source vector 402, a current angle 404, a rectifier voltage vector 406, and a vector 408 representing the voltage contribution of the reactance X. In this example, as shown in FIG. 4, the sending end is delivering active power P and reactive power Q, and $V_S$ has a higher magnitude and is leading $V_R$ by the power angle δ. In this example, when P=0, the reactive power Q relies mainly on the magnitude of $V_S$ and $V_R$. Also, $V_S$ and $V_R$ will be in phase.

$$P_R = \underbrace{\frac{V_S V_R}{X}}_{(=Pmax)} \sin\delta \text{ where } P_{max} = \frac{V_S V_R}{X}$$

$$Q_R = \frac{V_S V_R \cos\delta}{X} - \frac{V_R^2}{X}$$

$$Q_R = \frac{V_S V_R}{X} - \frac{V_R^2}{X} = \frac{V_R}{X}(V_S - V_R) \text{ if } P_R = 0$$

Figure 5:
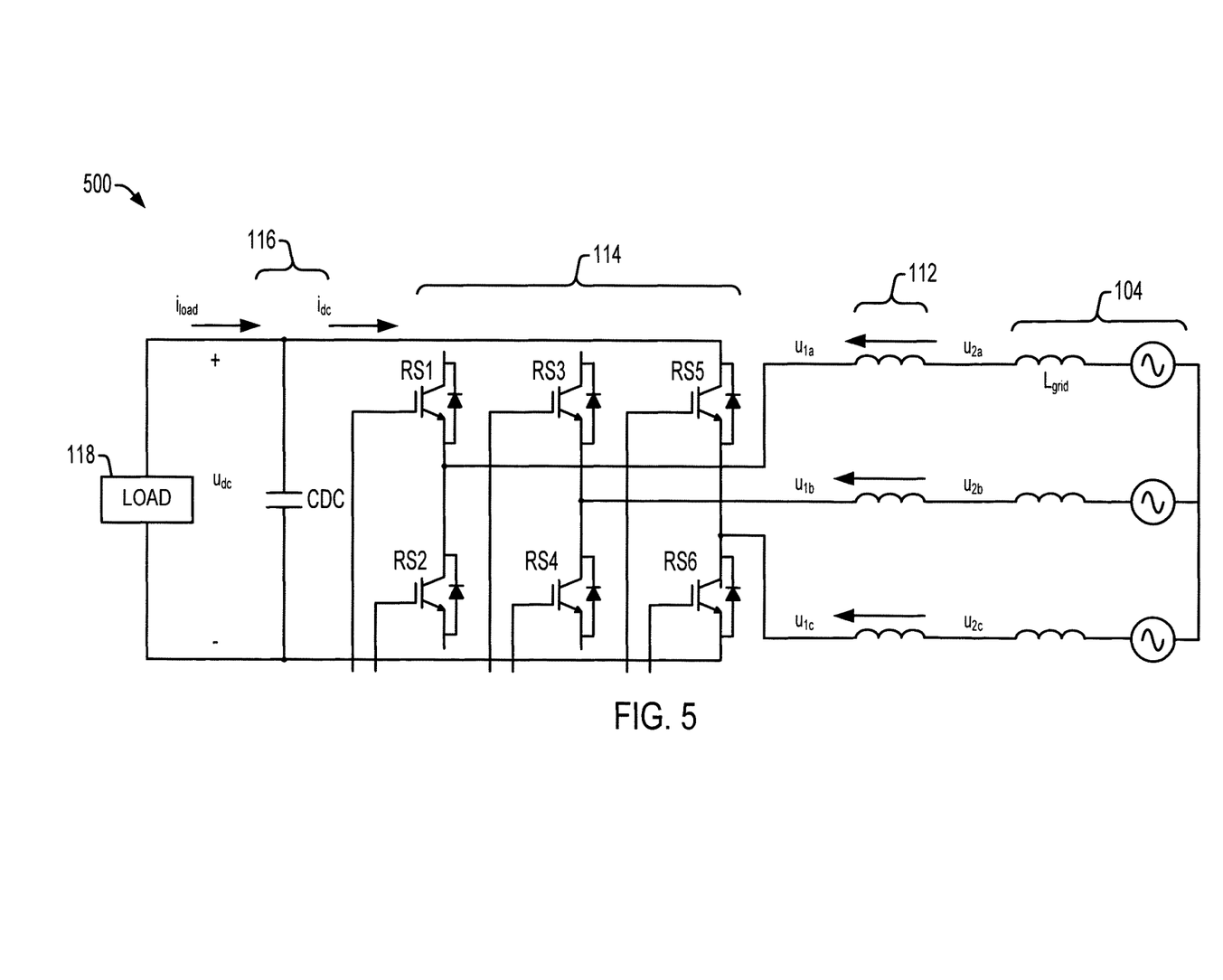
FIG. 5 is a schematic diagram.

FIG. 5 includes a circuit representation 500 of the power conversion system 102 of FIG. 1, where the relationship between the voltages and the converter current in the synchronous frame of reference are given as follows, where the subscript "d" represents reactive power, and the subscript "q" represents real (e.g., active) power:

$$\frac{(V_{Grid} - V_{Conv})}{jX_s} = 1$$

$$\frac{V_{dGrid} + jV_{qGrid} - (V_{dConv} + jV_{qConv})}{jX_s} = I_d + jI_q$$

Assuming perfect orientation, $V_{dGrid} = 0$ $$I_q = \frac{V_{dConv}}{X_s}$$

$$I_d = \frac{V_{dGrid} - V_{qConv}}{X_s}$$

If the total inductance Ls inductance is accurately known, Vdconv and Vqconv can be accurately calculated, and the corresponding DC bus voltage can be also calculated accurately. However, the inductance of the combined AC power source 104 and the filter 112 may be unknown and/or may vary over time, temperature, etc. in various applications. If the source and filter inductances are underestimated, not enough DC bus voltage will be provided and consequently the rectifier 114 must operate in the over modulation region, where system stability and control might suffer. If instead the inductance is overestimated, the modulation index will be lower than desired, possibly leading to less efficient operation, increase of current ripple, etc.

The rectifier controller 130 in one example uses modulation index control to improve the operation of the DC bus, particularly when it is desirable to inject reactive power to the grid for operation of the rectifier 114 as a static var compensator for power factor correction operation. The controller 130 mitigates uncertainty related to the value of the source inductance and improves the reliability and robustness of the system. The modulation index can be set to any given value to improve the efficiency of the rectifier 114 and provide adequate performance during transient conditions. This approach provides robust and reliable operation under several operating conditions and accommodates uncertainty regarding the source inductance, filter inductance, all additional stray inductances, etc.

Figure 6:
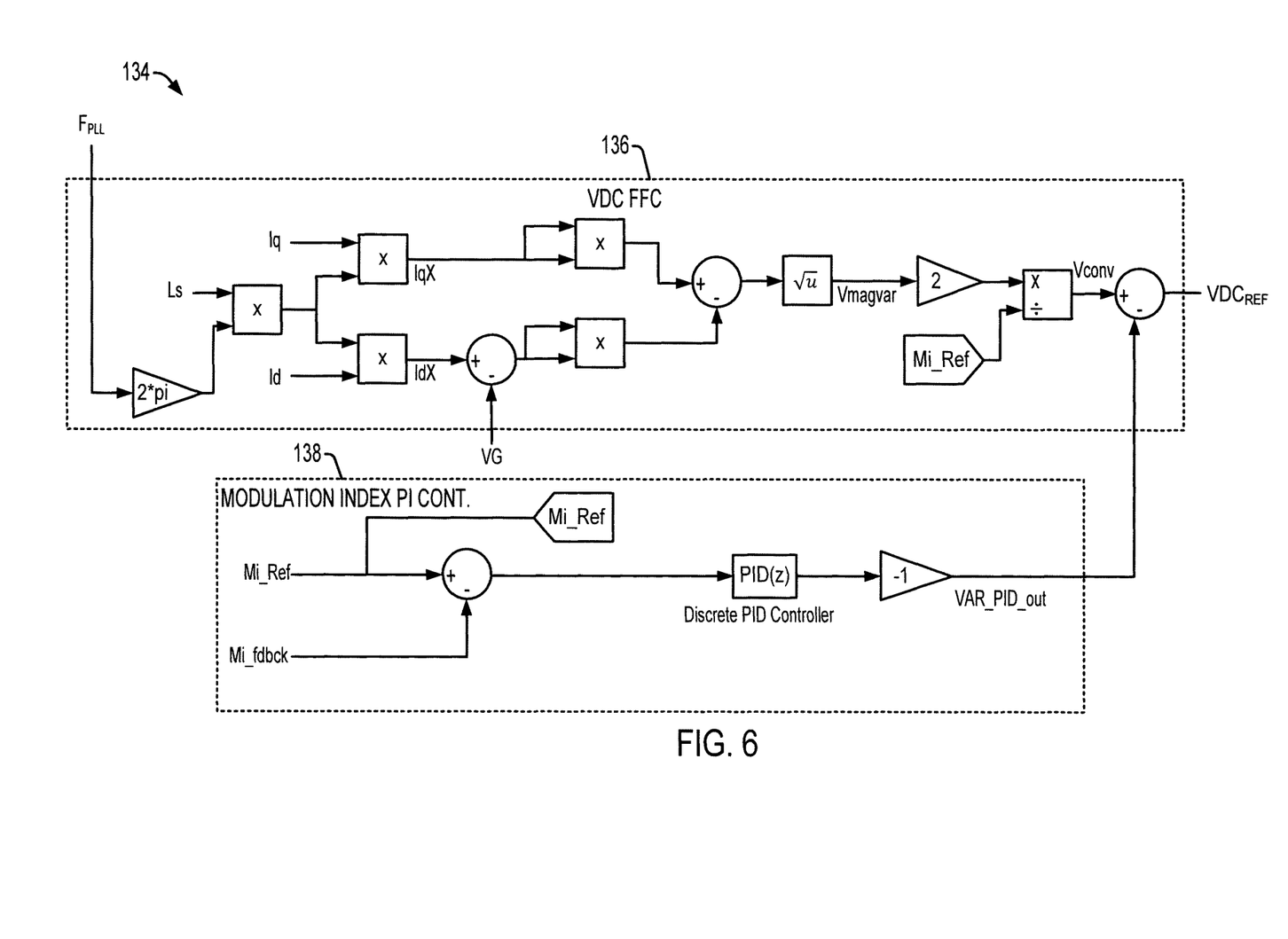
FIG. 6 is a schematic diagram.

FIG. 6 shows details of one example implementation of the controller 130 and an example DC bus voltage computation component 134. The rectifier controller 130 in one example implements the feedforward voltage component 136 to compute a converter voltage Vconv according to the estimated total inductance Ls of the AC input, the grid voltage VG of the AC input, and the modulation index reference Mi_Ref. The feedforward voltage component 136 also computes a voltage reference $VDC_{REF}$ according to the converter voltage Vconv and a reactive voltage offset signal VAR_PID_out. The modulation index controller 138 computes the reactive voltage offset signal VAR_PID_out according to an error signal that represents the error between the modulation index reference Mi_Ref and a feedback modulation index Mi_fdbck. The example modulator 133 generates the switching control signals according to the voltage reference $VDC_{REF}$ to cause the switching circuit to convert AC input power from the AC input to control the DC bus voltage VDC at the DC output. In the example of FIG. 6, the feedforward voltage component 136 computes a reactive volt amp magnitude Vmagvar according to the estimated total inductance Ls of the AC input, the active current Iq, the reactive current Id, and the grid voltage VG of the AC input, scales the reactive volt amp magnitude Vmagvar by the modulation index reference Mi_Ref to generate the converter voltage Vconv, and subtracts the reactive voltage offset signal VAR_PID_out from the converter voltage Vconv to generate the voltage reference $VDC_{REF}$. In the example of FIG. 6, the modulation index controller 138 includes a proportional integral (PI) controller that generates a control output to regulate the feedback modulation index Mi_fdbck according to the modulation index reference Mi_Ref. In one example, the estimator component 139 computes an actual total inductance Ls of the AC input according to the converter voltage $V_{conv}$, the feedback modulation index Mi_fdbck, the active current Iq, the reactive current Id, and the grid voltage VG of the AC input.

Figure 7:
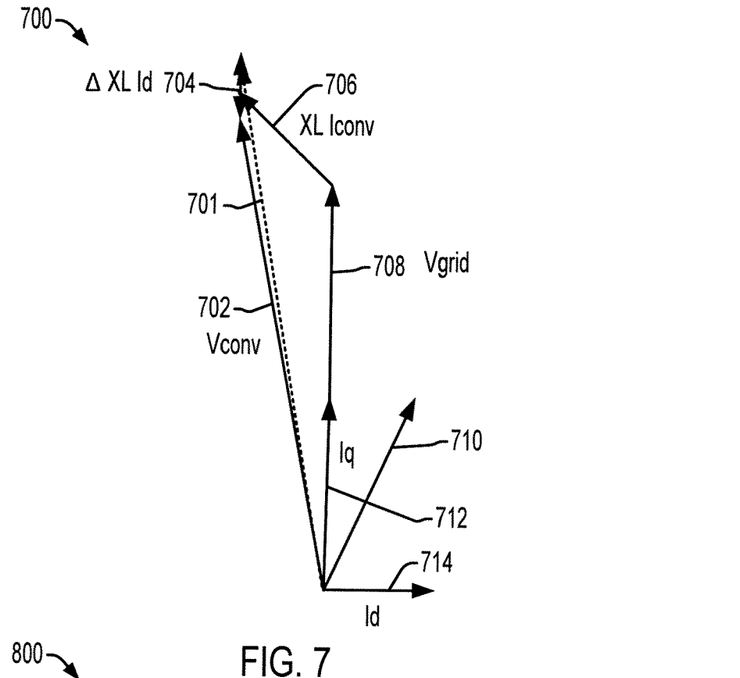
FIGS. 7 and 8 are vector diagrams.
Figure 8:
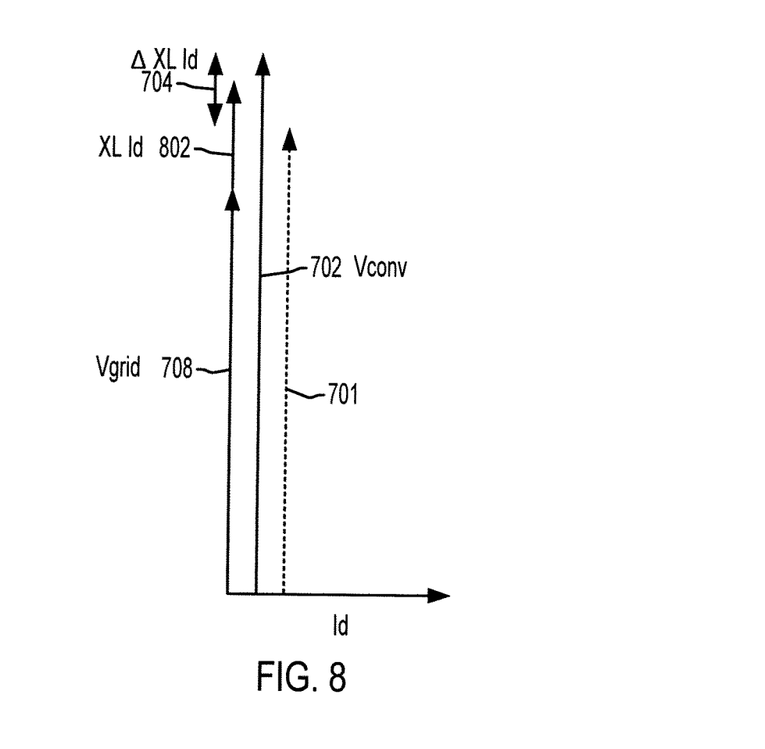

Referring also to FIGS. 7-11, FIGS. 7 and 8 show vector diagrams (e.g., phasor diagrams) 700 and 800, respectively, for different voltages and currents in the rectifier 114 under the influence of uncertainties in the source and/or filter inductance. FIGS. 7 and 8 include a converter voltage vector 701, 702 (e.g., $V_{conv}$) with different values (e.g., magnitudes and/or angles) depending on changing source inductance ΔXL Id represented by a vector 704. FIG. 7 also shows a converter inductor current vector 706 (XL $I_{conv}$), and a grid voltage vector 708 ($V_{grid}$), along with a composite vector 710 formed by a q-axis active or real current vector 712 (Iq) and the reactive d-axis current 714 (Id). FIG. 8 also shows a vector 802 (XL Id). From the vector diagrams 700 and 800, the converter voltage $V_{conv}$ can be expressed as:

$$(V_{conv})^2 = (V_g + IdX)^2 + (IqX)^2$$

$$V_{conv} = MI^*(V_{dc}/2)$$

where $$X = 2\pi f_{PLL} * L_{TOTAL}.$$

Figure 9:
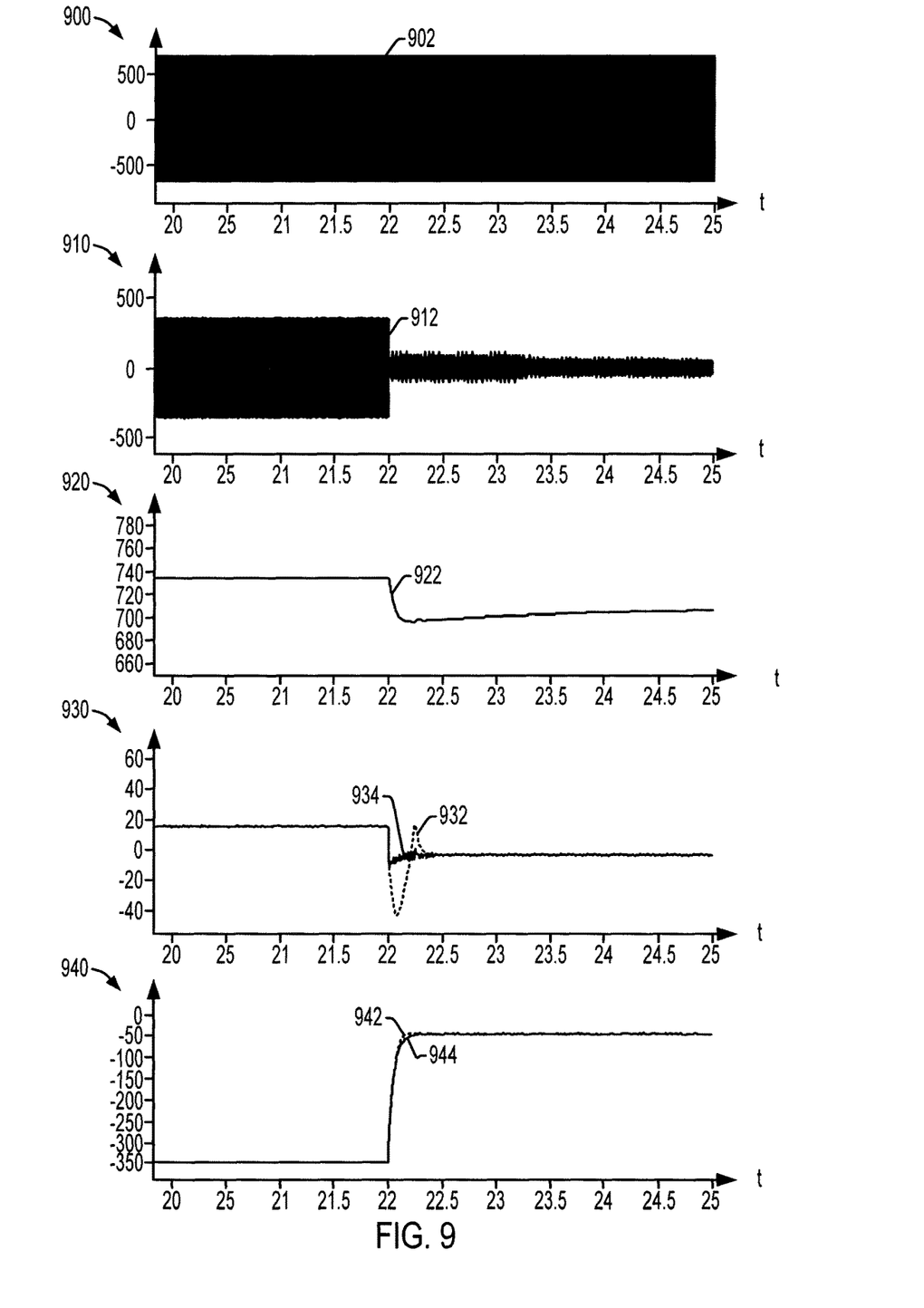
FIG. 9 is a graph.

FIG. 9 shows graphs 900, 910, 920, 930 and 940 of three phase line voltage (curve 902), three-phase rectifier input current (curve 912), DC bus voltage reference/feedback (e.g., $VDC_{REF}$, curve 922), active current feedback and reference (curves 932 and 934, respectively), and reactive current feedback and reference (curves 942 and 944, respectively). In this example, the modulation index-based DC bus optimization is illustrated for a change (e.g., sudden decrease) in the load conditions when the reactive current requirement Id changes from −350 to −50 amps. The graphs in FIG. 9 show simulated results for a total external inductance of 80 uH, and an actual inductance of 12 uH. The controller 130 operates the rectifier 114 to consume reactive power from the supply 104 through closed loop operation under a lower modulation index than would otherwise be feasible under same changing load conditions.

Figure 13:
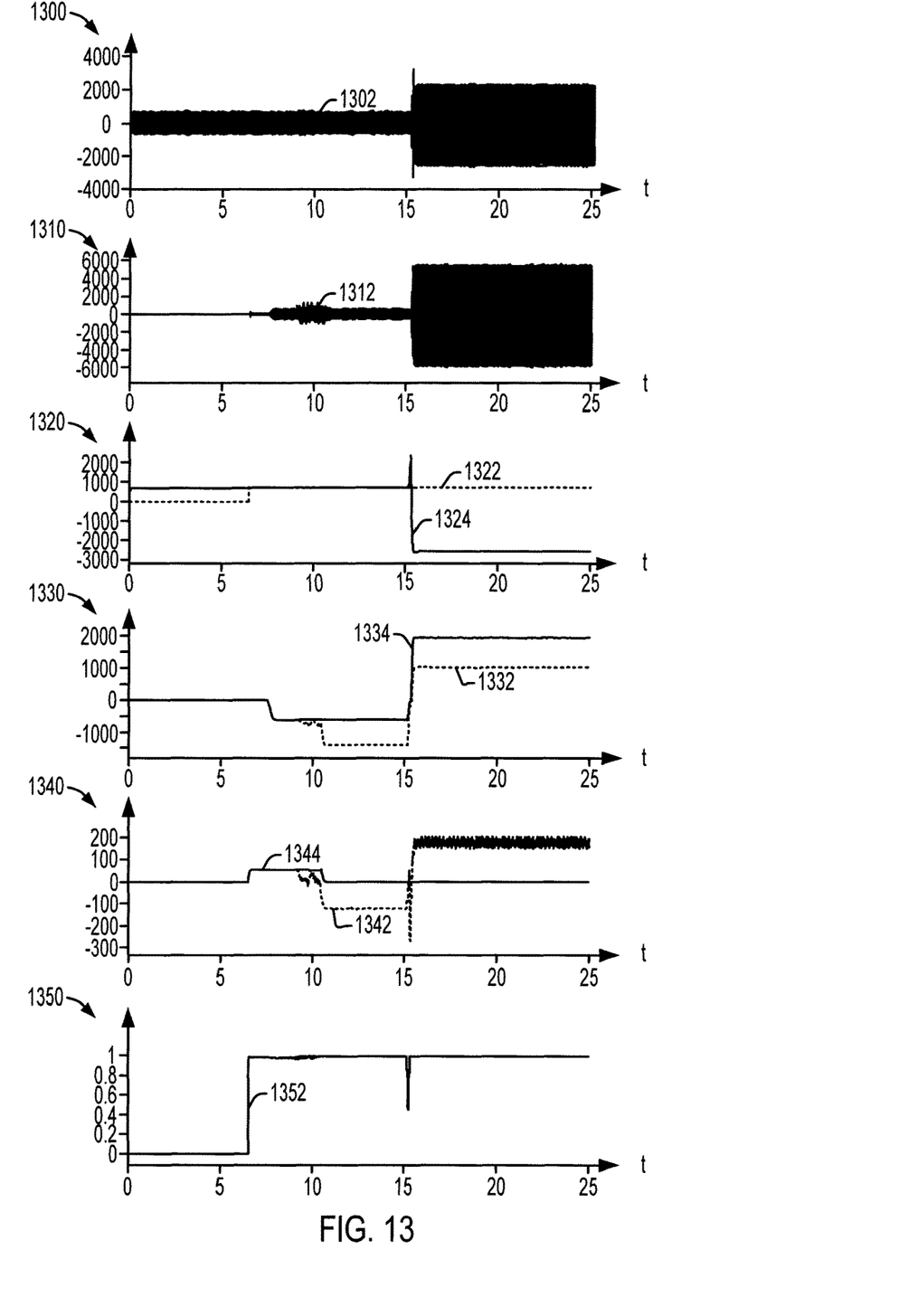
FIG. 13 is a graph.

Referring now to FIGS. 10-14, FIGS. 10 and 11 show vector diagrams (e.g., phasor diagrams) 1000 and 1100, respectively, illustrating rectifier operation at lower DC bus output voltage when operating at a lagging power factor by consuming reactive power from the supply. In this example, the modulation index-based DC bus control during a change (e.g., sudden decrease) in the load conditions when the reactive current requirement Id changes from −350 to −50 amps. The graphs in FIG. 13 show simulated results for a total external inductance of 80 uH, and an actual inductance of 12 uH. The controller 130 operates the rectifier 114 to consume reactive power from the supply 104 through closed loop operation under a lower modulation index than would otherwise be feasible under same changing load conditions.

Figure 10:
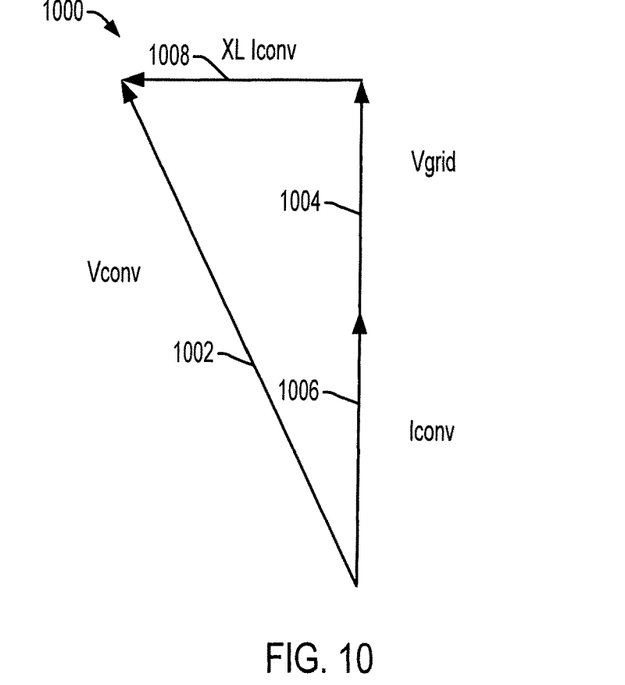
FIGS. 10 and 11 are vector diagrams.
Figure 11:
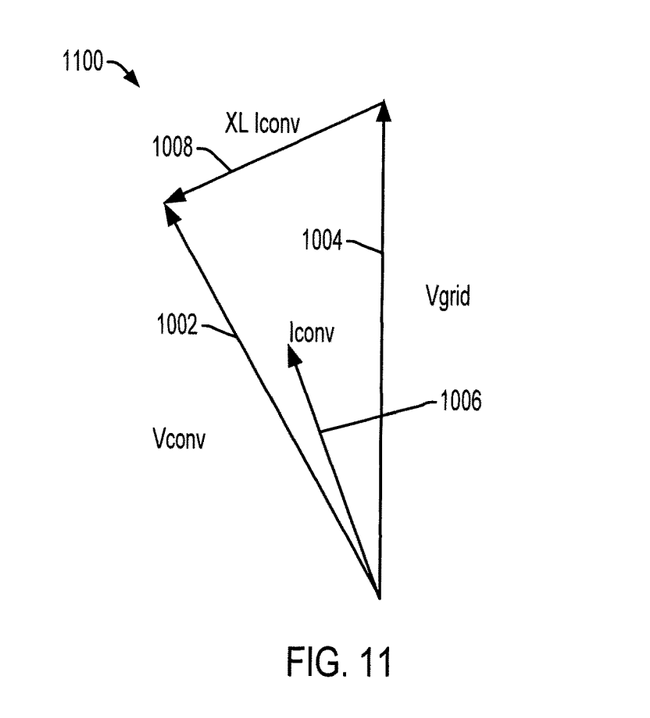

The reactive d-axis current Id in this example is controlled to maintain control the modulation index without the need to increase the DC bus voltage. This operation facilitates efficient power transfer without unduly increasing the DC bus voltage VDC by effectively increasing the total rectifier current through selective use of reactive current Id. In this regard, the vector diagrams 1000 and 1100 show a lagging converter voltage vector 1002, a grid voltage vector 1004, a total (e.g., d-axis and q-axis) converter current vector 1006, and a voltage vector 1008 (XL Iconv). In the diagram 1000 of FIG. 10, the reactive d-axis current Id is zero, and the diagram 1100 of FIG. 11 shows an example where the controller 130 effectively uses a non-zero reactive d-axis current Id. By this technique, the controller 130 can operate the rectifier 114 at lower output voltage if it is operating at lagging power factor by consuming reactive power from the supply 104. This facilitates efficient power transfer without the need to unduly increase the DC bus voltage VDC, while effectively increasing the total converter current Iconv=sqrt (Id²+Iq²). In this example, $$(V_{conv})^2 = (V_g + IdX)^2 + (IqX)^2$$

$$V_{conv} = MI*(V_{dc}/2)$$

where $$X = 2\pi f_{FLL} * L_{TOTAL}.$$

Figure 12:
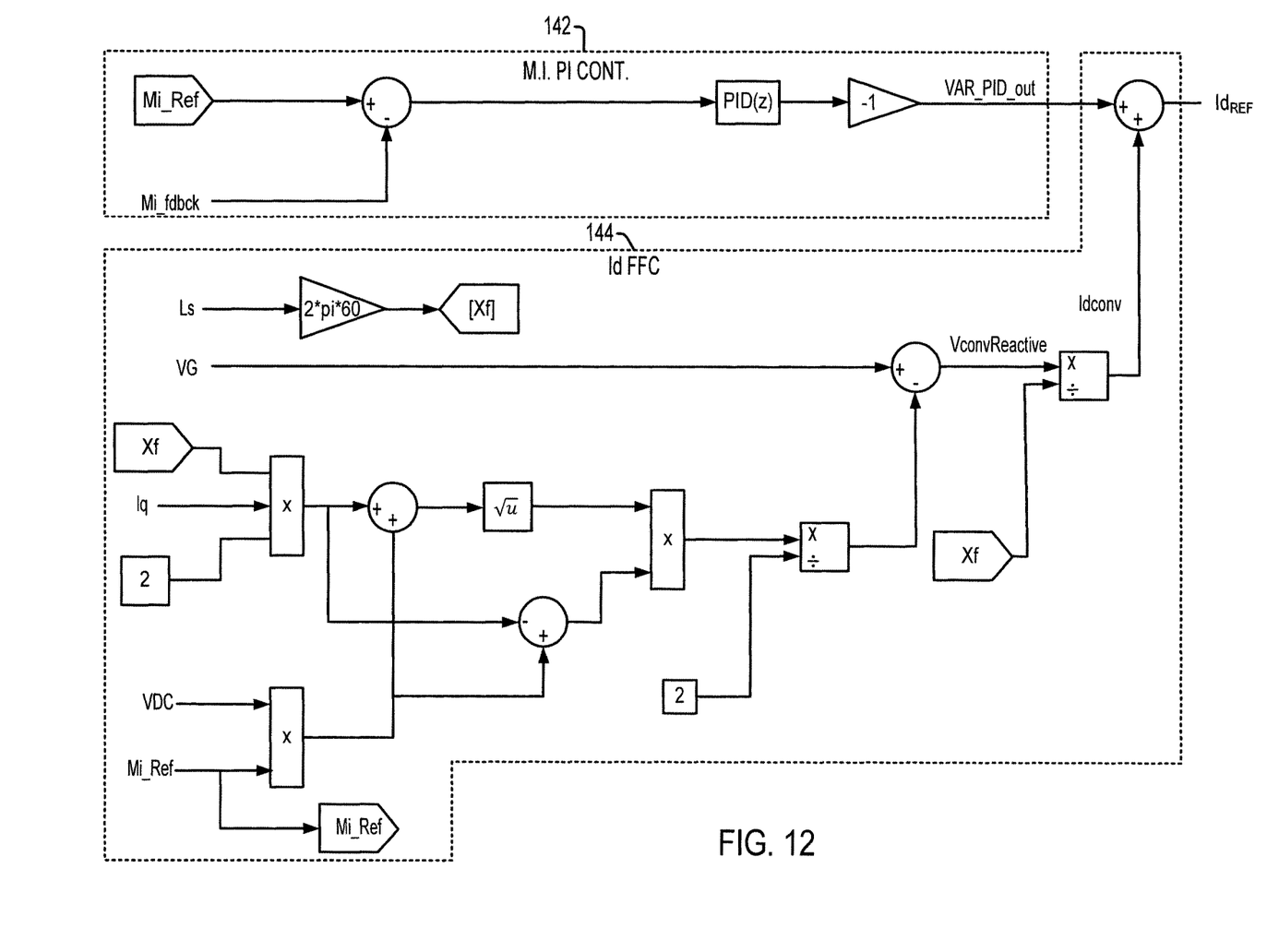
FIG. 12 is a schematic diagram.

Referring also to FIG. 12, the controller 130 in one example controls the d-axis reactive current by computing a control reference value $Id_{REF}$ in one example to maintain control of the modulation index without the need to unduly increase the DC bus voltage. FIG. 12 shows details of one example implementation of the controller 130 including the feedforward reactive current component 144 and the modulation index controller 142 of FIG. 1 above. The rectifier controller 130 in this example implements the feedforward reactive current component 144 to compute a converter reactive current Idconv according to the estimated total inductance Ls of the AC input, the grid voltage VG of the AC input, and a modulation index reference Mi_Ref. In addition, the feedforward reactive current component 144 computes a reactive current reference $Id_{REF}$ according to the converter reactive current Idconv and a reactive current offset signal VAR_PID_out from the modulation index control or component 142. In this example, the modulation index controller 142 computes the reactive current offset signal VAR_PID_out according to an error signal representing the error between the modulation index reference Mi_Ref and a feedback modulation index Mi_fdbck. The modulator 133 generates the switching control signals according to the reactive current reference $Id_{REF}$ to cause the switching circuit to convert AC input power from the AC input to control the DC bus voltage VDC. In the example of FIG. 12, the feedforward reactive current component 144 computes a reactive voltage value VconvReactive according to the estimated total inductance Ls of the AC input, the grid voltage VG of the AC input, and the modulation index reference Mi_Ref. In addition, the feedforward reactive current component 144 scales the reactive voltage value VconvReactive by an estimated total reactance Xf of the AC input to generate the converter reactive current Idconv and adds the reactive current offset signal VAR_PID_out to the converter reactive current Idconv to generate the reactive current reference $Id_{REF}$ as shown in FIG. 12.

Figure 14:
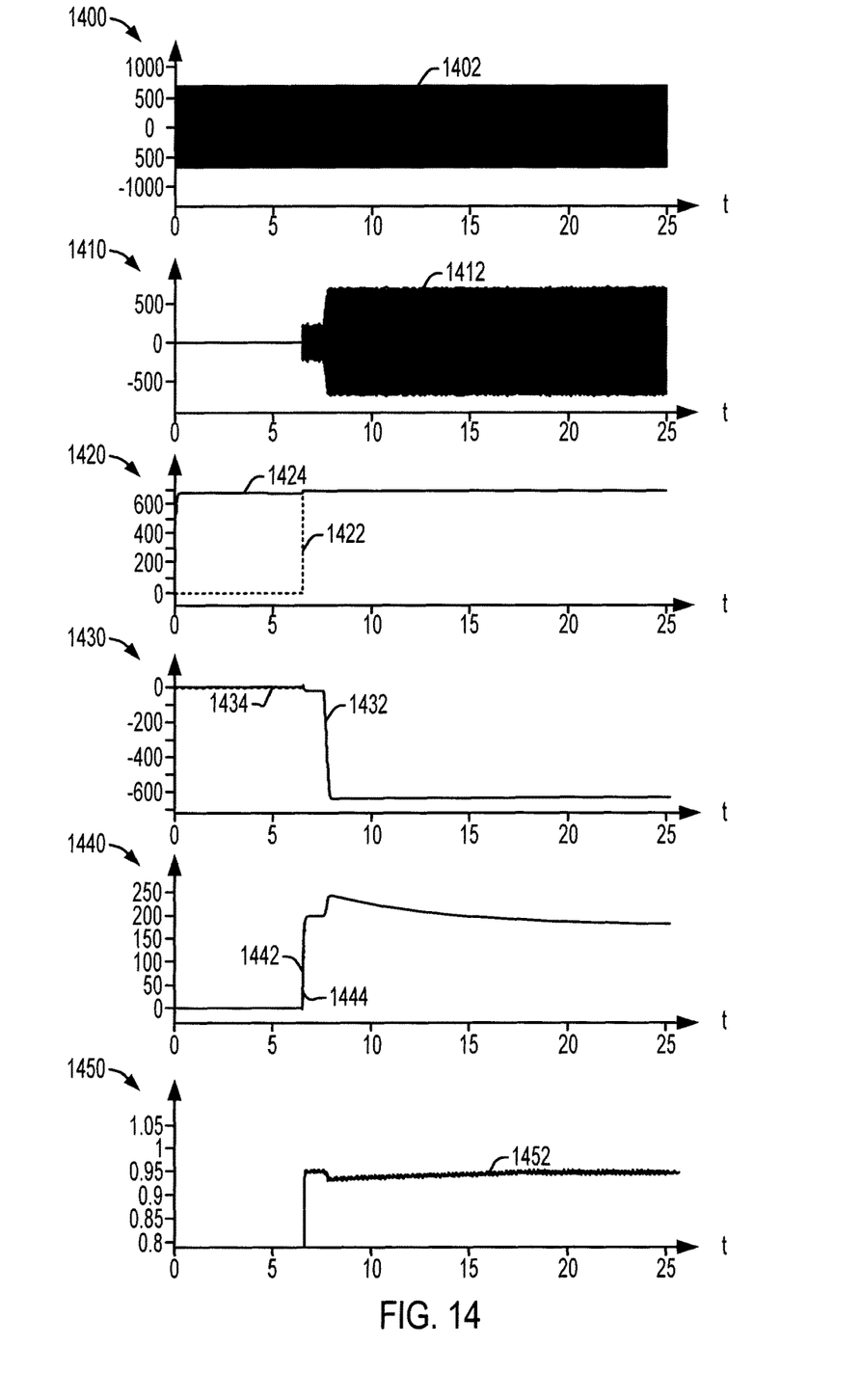
FIG. 14 is a graph.

FIG. 13 shows respective graphs 1300, 1310, 1320, 1330, 1340 and 1350 of three phase line voltage (curve 1302), three-phase rectifier input current (curve 1312), DC bus voltage reference/feedback (e.g., $VDC_{REF}$, curve 1322), active current feedback and reference (curves 1332 and 1334, respectively), reactive current feedback and reference (curves 1342 and 1344, respectively), and normalized modulation index. No reactive power control is used in this example. This example shows a system collapse under sudden regeneration from 0 to 500 amps DC amps in 50 ms with 150 uH source inductance. Use of the described example reactive power control is illustrated in the simulation graphs of FIG. 14. This example shows respective graphs 1400, 1410, 1420, 1430, 1440 and 1450 of three phase line voltage (curve 1402), three-phase rectifier input current (curve 1412), DC bus voltage reference/feedback (e.g., $VDC_{REF}$, curve 1422), active current feedback and reference (curves 1432 and 1434, respectively), reactive current feedback and reference (curves 1442 and 1444, respectively), and normalized modulation index. Reactive power control is used in this example, during system collapse under sudden regeneration from 0 to 500 amps DC amps in 50 ms with 150 uH source inductance.

Described examples use an additional modulation index controller to control the reactive power, which can quickly react to enhance the power transfer, even at a relatively low DC bus condition to accommodate loading changes. The described examples mitigate or avoid inefficiencies formerly caused by uncertainty related to the value of the source inductance. This, in turn, can facilitate improved system reliability and robustness, for example, where the modulation index can be set to any given value to improve or tailor power transfer.

In the preceding specification, various embodiments have been described with reference to the accompanying drawings. It will be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The following is claimed:

1. A power conversion system, comprising:
   a rectifier having an AC input with AC nodes (A, B, C), a DC output with first and second DC nodes, and a switching circuit coupled with the AC input and with the DC output, the switching circuit including switching devices respectively configured to selectively couple one of the AC nodes with a respective one of the first and second DC nodes according to a respective switching control signal;

an inverter having an inverter input coupled to the DC output of the rectifier, an inverter output with output phase lines, and inverter switches respectively configured to selectively couple one of the DC nodes with a respective one of the output phase lines according to a respective inverter switching control signal;

a controller, configured to:
provide inverter switching control signals to operate the switches of the inverter to regulate or control an electrical parameter of the inverter output;
compute a converter voltage according to an estimated total inductance of the AC input, a grid voltage of the AC input, and a modulation index reference;
compute a voltage reference according to the converter voltage and a reactive voltage offset signal;
compute the reactive voltage offset signal according to an error signal representing an error between the modulation index reference and a feedback modulation index; and
generate the switching control signals according to the voltage reference to cause the switching circuit to convert AC input power from the AC input to control the DC bus voltage at the DC output.

2. The power conversion system of claim 1, wherein the controller is configured to:
compute a reactive volt amp magnitude according to the estimated total inductance of the AC input, an active current, a reactive current, and the grid voltage of the AC input;
scale the reactive volt amp magnitude by the modulation index reference to generate the converter voltage; and
subtract the reactive voltage offset signal from the converter voltage to generate the voltage reference.

3. The power conversion system of claim 2, wherein the controller is configured to generate a control output to regulate the feedback modulation index according to the modulation index reference.

4. The power conversion system of claim 2, wherein the controller is configured to compute an actual total inductance of the AC input according to the converter voltage, the feedback modulation index, the active current, the reactive current, and the grid voltage of the AC input.

5. The power conversion system of claim 1, wherein the controller is configured to compute an actual total inductance of the AC input according to the converter voltage, the feedback modulation index, an active current, a reactive current, and the grid voltage of the AC input.

6. The power conversion system of claim 1, wherein the controller is configured to generate a control output to regulate the feedback modulation index according to the modulation index reference.

7. A power conversion system, comprising:
a rectifier having an AC input with AC nodes, a DC output with first and second DC nodes, and a switching circuit coupled with the AC input and with the DC output, the switching circuit including switching devices respectively configured to selectively couple one of the AC nodes with a respective one of the first and second DC nodes according to a respective switching control signal;
an inverter having an inverter input coupled to the DC output of the rectifier, an inverter output with output phase lines, and inverter switches respectively configured to selectively couple one of the DC nodes with a respective one of the output phase lines according to a respective inverter switching control signal; and
a controller, configured to:
provide inverter switching control signals to operate the switches of the inverter to regulate or control an electrical parameter of the inverter output;
compute a converter reactive current according to an estimated total inductance of the AC input, a grid voltage of the AC input, and a modulation index reference;
compute a reactive current reference according to the converter reactive current and a reactive current offset signal;
compute the reactive current offset signal according to an error signal representing an error between the modulation index reference and a feedback modulation index; and
generate the switching control signals according to the reactive current reference to cause the switching circuit to convert AC input power from the AC input to control the DC bus voltage at the DC output.

8. The power conversion system of claim 7, wherein the controller is configured to:
compute a reactive voltage value according to the estimated total inductance of the AC input, the grid voltage of the AC input, and the modulation index reference;
scale the reactive voltage value by an estimated total reactance of the AC input to generate the converter reactive current; and
add the reactive current offset signal to the converter reactive current to generate the reactive current reference.

9. The power conversion system of claim 8, wherein the controller is configured to generate a control output to regulate the feedback modulation index according to the modulation index reference.

10. The power conversion system of claim 8, wherein the controller is configured to compute an actual total inductance of the AC input according to the converter voltage, the feedback modulation index, an active current, a reactive current, and the grid voltage of the AC input.

11. The power conversion system of claim 7, wherein the controller is configured to compute an actual total inductance of the AC input according to the converter voltage, the feedback modulation index, an active current, a reactive current, and the grid voltage of the AC input.

12. The power conversion system of claim 7, wherein the controller is configured to generate a control output to regulate the feedback modulation index according to the modulation index reference.

13. A method to control a rectifier, comprising:
generating switching control signals according to a reference to cause a switching circuit to convert AC input power from an AC input to control a DC bus voltage;
computing the reference according to an estimated total inductance of the AC input, a grid voltage of the AC input, a modulation index reference, and a reactive power offset signal;
computing the reactive power offset signal according to an error signal representing an error between the modulation index reference and a feedback modulation index; and
computing an actual total inductance of the AC input according to a converter voltage, the feedback modulation index, an active current, a reactive current, and the grid voltage of the AC input.

14. The method of claim 13, further comprising:
computing a converter voltage according to the estimated total inductance of the AC input, the grid voltage of the AC input, and the modulation index reference;
computing a voltage reference according to the converter voltage and a reactive voltage offset signal; and
generating the switching control signals according to the voltage reference to cause the switching circuit to convert AC input power from the AC input to control the DC bus voltage at the DC output.

15. The method of claim 14, further comprising:
computing a reactive volt amp magnitude according to the estimated total inductance of the AC input, the active current, the reactive current, and the grid voltage of the AC input;
scaling the reactive volt amp magnitude by the modulation index reference to generate the converter voltage; and
subtracting the reactive voltage offset signal from the converter voltage to generate the voltage reference.

16. The method of claim 15, further comprising generating a control output to regulate the feedback modulation index according to the modulation index reference.

17. The method of claim 13, further comprising:
computing a converter reactive current according to the estimated total inductance of the AC input, the grid voltage of the AC input, and the modulation index reference;
computing a reactive current reference according to the converter reactive current and a reactive current offset signal; and
generating the switching control signals according to the reactive current reference to cause the switching circuit to convert AC input power from the AC input to control the DC bus voltage at the DC output.

18. The method of claim 17, further comprising:
computing a reactive voltage value according to the estimated total inductance of the AC input, the grid voltage of the AC input, and the modulation index reference;
scaling the reactive voltage value by an estimated total reactance of the AC input to generate the converter reactive current; and
adding the reactive current offset signal to the converter reactive current to generate the reactive current reference.

19. The method of claim 18, further comprising:
generating a control output to regulate the feedback modulation index according to the modulation index reference.

20. The method of claim 13, further comprising:
generating a control output to regulate the feedback modulation index according to the modulation index reference.

* * * * *